(12) United States Patent
Finnerty et al.

(10) Patent No.: US 9,281,531 B2
(45) Date of Patent: Mar. 8, 2016

(54) ELECTROCHEMICAL SYSTEM HAVING MULTIPLE INDEPENDENT CIRCUITS

(75) Inventors: Caine Finnerty, Buffalo, NY (US); Yanhai Du, East Amherst, NY (US); Jun Cai, Midland, MI (US)

(73) Assignee: CP SOFC IP, LLC, Ann Arbor, MI (US)

( * ) Notice: Subject to any disclaimer, the term of this patent is extended or adjusted under 35 U.S.C. 154(b) by 0 days.

(21) Appl. No.: 13/023,274

(22) Filed: Feb. 8, 2011

(65) Prior Publication Data

US 2011/0143242 A1    Jun. 16, 2011

Related U.S. Application Data

(63) Continuation of application No. 11/807,190, filed on May 25, 2007, now abandoned.

(51) Int. Cl.
*H01M 8/04* (2006.01)
*C25B 9/18* (2006.01)
(Continued)

(52) U.S. Cl.
CPC ............. *H01M 8/04365* (2013.01); *C25B 9/18* (2013.01); *C25B 15/02* (2013.01); *H01M 8/04559* (2013.01); *H01M 8/04604* (2013.01); *H01M 8/04619* (2013.01); *H01M 8/083* (2013.01); *H01M 8/086* (2013.01); *H01M 8/1011* (2013.01); *H01M 8/243* (2013.01); *H01M 8/2435* (2013.01); *H01M 2008/1095* (2013.01); *H01M 2008/1293* (2013.01); *H01M 2008/147* (2013.01); *Y02E 60/50* (2013.01); *Y02E 60/523* (2013.01); *Y02E 60/525* (2013.01); *Y02E 60/526* (2013.01)

(58) Field of Classification Search
CPC ... H01M 8/004; H01M 8/0252; H01M 8/243; H01M 2008/1293; H01M 8/04611
USPC ......... 429/428, 452, 466, 497, 430, 465, 431, 429/433, 479
See application file for complete search history.

(56) References Cited

U.S. PATENT DOCUMENTS 3,402,230 A    9/1968    White, Jr.
3,853,723 A    12/1974   Mack
(Continued)

FOREIGN PATENT DOCUMENTS

DE    1596119        6/1966
EP    1521327 A2     6/2005
(Continued)

OTHER PUBLICATIONS

Selimovic et al., "Networked Solid Oxide Fuel Cell Stacks Combines with a Gas Turbine Cycle," 2002, pp. 76-82, Journal of Power Sources, vol. 106.
(Continued)

*Primary Examiner* — Ula C Ruddock
*Assistant Examiner* — Thomas Parsons
(74) *Attorney, Agent, or Firm* — Burns & Levinson LLP

(57) ABSTRACT

The present teachings relate to an electrochemical system including an electrochemical device and multiple independent circuits which permit independent control of the reaction rates at different sections of the electrochemical device. The electrochemical device can be a fuel cell or an electrolyzer, and can include a common electrode in electrical communication with two or more independent circuits. The present teachings also relate to operating methods of the electrochemical system described.

20 Claims, 4 Drawing Sheets

(51) Int. Cl.
*C25B 15/02* (2006.01)
*H01M 8/08* (2006.01)
*H01M 8/10* (2006.01)
*H01M 8/24* (2006.01)
*H01M 8/12* (2006.01)
*H01M 8/14* (2006.01)

(56) References Cited

U.S. PATENT DOCUMENTS

| | | | |
|---|---|---|---|
| 4,799,936 A | | 1/1989 | Riley |
| 4,883,497 A | * | 11/1989 | Claar et al. .................. 29/623.5 |
| 5,164,273 A | | 11/1992 | Szasz et al. |
| 5,686,196 A | | 11/1997 | Singh et al. |
| 5,686,198 A | * | 11/1997 | Kuo et al. ..................... 429/466 |
| 6,165,638 A | | 12/2000 | Spillman et al. |
| 6,770,395 B2 | * | 8/2004 | Virkar et al. .................. 429/454 |
| 6,811,913 B2 | * | 11/2004 | Ruhl .............................. 429/430 |
| 6,936,366 B2 | | 8/2005 | Kearl et al. |
| 7,041,405 B2 | | 5/2006 | Skiba et al. |
| 7,063,905 B2 | | 6/2006 | Menon et al. |
| 7,150,932 B1 | | 12/2006 | Höfler et al. |
| 7,153,601 B2 | | 12/2006 | Mardilovich et al. |
| 7,247,400 B2 | * | 7/2007 | Oyabe et al. .................. 429/432 |
| 2001/0010873 A1 | | 8/2001 | Thom |
| 2003/0015431 A1 | | 1/2003 | Barker et al. |
| 2003/0235730 A1 | * | 12/2003 | Noetzel et al. ................. 429/23 |
| 2005/0069757 A1 | | 3/2005 | Stefener et al. |
| 2006/0210843 A1 | | 9/2006 | Masse et al. |
| 2007/0099065 A1 | * | 5/2007 | Rawson et al. ................. 429/40 |

FOREIGN PATENT DOCUMENTS

| | | | |
|---|---|---|---|
| WO | 01/24300 A1 | | 4/2001 |
| WO | 02/19446 A2 | | 3/2002 |
| WO | 03/083975 A2 | | 10/2003 |
| WO | 03/083975 A3 | | 10/2003 |
| WO | 2005/008820 | | 1/2005 |
| WO | WO2005008820 | * | 1/2005 |
| WO | 2006/113491 | | 10/2006 |

OTHER PUBLICATIONS

International Search Report from the International Search Authority for International Application No. PCT/US2007/012490, mailed Feb. 20, 2008, 7 pages.

Written Opinion of the International Search Report for International Application Serial No. PCT/US2007/012490, dated Feb. 20, 2008, 10 pages.

* cited by examiner

ELECTROCHEMICAL SYSTEM HAVING MULTIPLE INDEPENDENT CIRCUITS

CROSS REFERENCE TO RELATED APPLICATIONS

This application is a continuation of U.S. patent application Ser. No. 11/807,190, filed on May 25, 2007, now abandoned, the disclosure of which is incorporated by reference herein in its entirety.

INTRODUCTION

The present teachings relate to electrochemical systems and devices, and more specifically to electrochemical systems and devices including multiple independent circuits.

Electrochemical devices, such as fuel cells, can provide clean efficient power. For example, fuel cells can convert a hydrogen fuel and an oxidant into electricity through an electrochemical reaction with only water and heat as by-products. In general, fuel cells typically include an anode and a cathode separated by an electrolyte. The electrolyte only allows the passage of certain types of ions or protons. In a solid oxide fuel cell, the oxidant is directed to the cathode, where it is ionized by electrons in the electrical circuit. The ionized oxygen then flows through the electrolyte and reacts with the hydrogen fuel at the anode, resulting in the formation of water and electrons. The electrons flowing out of the anode to the circuit can power an external load.

The rate at which these reactions occur is dependant, in part, upon the electrical load applied to the electrical circuit, the amount of fuel present at the anode, the amount of oxidant present at the cathode, the fuel cell component materials and their microstructure, and the operating temperature and pressure of the fuel cell. Applying a high electrical load to the electrical circuit will drive many electrons to the cathode and ionize most if not all of the oxidant, thus producing more electrons at the anode. As a result, a large current is drawn from the fuel cell. If the electrical load applied to the electrical circuit is low, less oxidant will be ionized and fewer electrons will be produced, resulting in a small current.

Most fuel cells include only one electrical circuit, which applies a single electrical load to the entire fuel cell. This configuration can be inefficient and may cause several problems. First, electrons are required to travel the entire length of the fuel cell, which can result in considerable energy loss. For example, if the fuel cell is a tubular fuel cell having electrical connections for the electrical circuit at one end of the fuel cell, electrons produced at the other end of the fuel cell will need to travel the length of the circuit, i.e., the entire length of the fuel cell and through an external circuit, to an attached load. Second, not all sections of the fuel cell provide power at the same power of density (i.e., the amount of power per unit area). For example, if an electrical load is applied to the fuel cell circuit that results in a voltage of approximately 0.5-0.7 V across the fuel cell, most of the fuel will be consumed at the front end of the cell, e.g., within the first 10 mm of the cell, resulting in a higher reaction rate and a higher power density at the front end than the rest of the cell. However, as fuel is consumed along the length of the cell, the concentration of the fuel decreases and less fuel is available at the back end of the cell. This results in a lower reaction rate and a lower power density at the back end of the cell when compared to the front end of the cell.

Additionally, controlling the temperature of a single-circuit fuel cell can be difficult. The front end of the cell, where a larger portion of the fuel is consumed, tends to operate at a higher temperature than the back end of the cell. For example, solid oxide fuel cells usually operate between about 650° C. and about 1000° C. Various components of solid oxide fuel cells cannot withstand this high operating temperature range. Silver, a common material for current collection parts, has a melting point of about 960° C. If the temperature of the solid oxide fuel cell cannot be regulated to a temperature below 960° C., the silver current collection components can melt. Furthermore, hot spots, or high temperature sections, may be present, which can decrease fuel cell performance. These hotspots can lead to cracking of the fuel cell and affect the useful life of the fuel cell. Additionally, excessively high temperatures can result in the sintering of various fuel cell components, which is a common cause of degradation of the fuel cell.

Last but not least, the reaction rate differential throughout the fuel cell can result in increased coking (i.e., deposition of carbon on the anode of the fuel cell) and also can create an oxidizing environment at the back end of the fuel cell. In particular, since the fuel is usually a mixture of hydrocarbon(s) and oxidant(s), once most of the fuel is consumed and converted to electrons and water, the relative partial pressure of the oxidant(s) is increased. This oxidizing atmosphere can damage the anode, especially towards the anode outlet.

Therefore, a need exists for electrochemical devices that can provide improved regulation of temperature, minimize the deposition of interfering substances on the electrodes and/or operate at increased efficiency.

SUMMARY

In light of the foregoing, the present teachings provide electrochemical systems and devices having multiple independent electrical circuits that can provide improved thermal control, self-cleaning characteristics and/or increased operational efficiency, as well as methods for operating such electrochemical systems and devices.

One aspect of the present teachings relates to an electrochemical device having a first electrode, a second electrode, and a third electrode, where the first electrode and the second electrode are of a first type, and the third electrode is of a second type that is complementary to the first type of electrode. The electrochemical device also includes a first electrical circuit and a second electrical circuit, where the first electrical circuit includes a first loading device that is in electrical communication with the first electrode and the third electrode, and the second electrical circuit includes a second loading device that is in electrical communication with the second electrode and the third electrode. The electrochemical device, for example, can be an electrolyzer or a fuel cell. If the electrochemical device is a fuel cell, it can be a solid oxide fuel cell, a proton exchange membrane fuel cell, a phosphoric acid fuel cell, an alkaline fuel cell, a molten carbonate fuel cell, or a direct methanol fuel cell. The fuel cell can have various geometries and/or configurations including, but not limited to, tubular or planar, as well as including a monolith structure.

In some embodiments, each of the first electrode and the second electrode is an anode and the third electrode is a cathode. In other embodiments, each of the first electrode and the second electrode is a cathode and the third electrode is an anode. In some embodiments, the fuel cell is an anode-supported, cathode-supported, substrate-supported or electrolyte-supported structure.

In some embodiments, the first loading device and the second loading device are adapted to operate independently at different electrical loads. For example, the first loading device can apply a first electrical load to the first electrical circuit, resulting in a first electrical potential between about 0.3 V and an open circuit voltage across the first electrode and the third electrode. Similarly, the second loading device can apply a second electrical load to the second electrical circuit, resulting in a second electrical potential between about 0.3 V and an open circuit voltage across the second electrode and the third electrode. The first loading device and the second loading device can be adapted to operate simultaneously at the same electrical load, simultaneously at different electrical loads, out-of-phase at the same electrical load, or out-of-phase at different electrical loads. For example, at a certain point of time, the first loading device can be adapted to operate at an electrical load that results in an electrical potential of about 0.5 V across the first electrode and the second electrode. At the same time, the second loading device can operate at an electrical load that results in an electrical potential of about 1.1 V across the second electrode and the third electrode. At a different point of time, the second loading device can be adapted to operate at an electrical load that results in an electrical potential of about 0.5 V across the second electrode and the third electrode, while the operation of the first loading device results in an electrical potential of about 1.1 V across the first electrode and the second electrode. The first loading device and the second loading device can be adapted to operate independently to draw an independent current output and an independent power output from each of the first electrical circuit and the second electrical circuit.

The present teachings also relate to fuel cell stacks including two or more of the fuel cells described above.

Another aspect of the present teachings relates to methods of operating an electrochemical device. The method can include providing an electrochemical device having a first electrical circuit including a first loading device and a second electrical circuit including a second loading device, where the first electrical circuit and the second electrical circuit are in electrical communication with a common electrode; applying a first electrical load to the first electrical circuit; and applying a second electrical load to the second electrical circuit. The electrical device can be an electrolyzer or a fuel cell having one or more of the features described above.

In some embodiments, the first electrical circuit is in electrical communication with a first anode, and the second electrical circuit is in electrical communication with a second anode. A fuel can be alternatively introduced to one of the first anode and the second anode. In some embodiments, the first electrical circuit is in electrical communication with a first cathode, and the second electrical circuit is in electrical communication with a second cathode, and an oxidant can be alternatively introduced to one of the first cathode and the second cathode.

Another aspect of the present teachings relates to an electrochemical system having a fuel cell in electrical communication with a first circuit and a second circuit, where the first circuit and the second circuit are adapted to operate independently. In some embodiments, the electrochemical system includes a microprocessor adapted to control the first circuit and the second circuit. The fuel cell can have one or more of the features described above.

The foregoing, other features, and advantages of the present teachings will be more fully understood from the following figures, description, and claims.

BRIEF DESCRIPTION OF THE DRAWINGS

It should be understood that the drawings are not necessarily to scale, with emphasis generally being placed upon illustrating the principles of the present teachings. The drawings are not intended to limit the scope of the present teachings in any way.

DETAILED DESCRIPTION OF THE PREFERRED EMBODIMENTS

Figure 1:
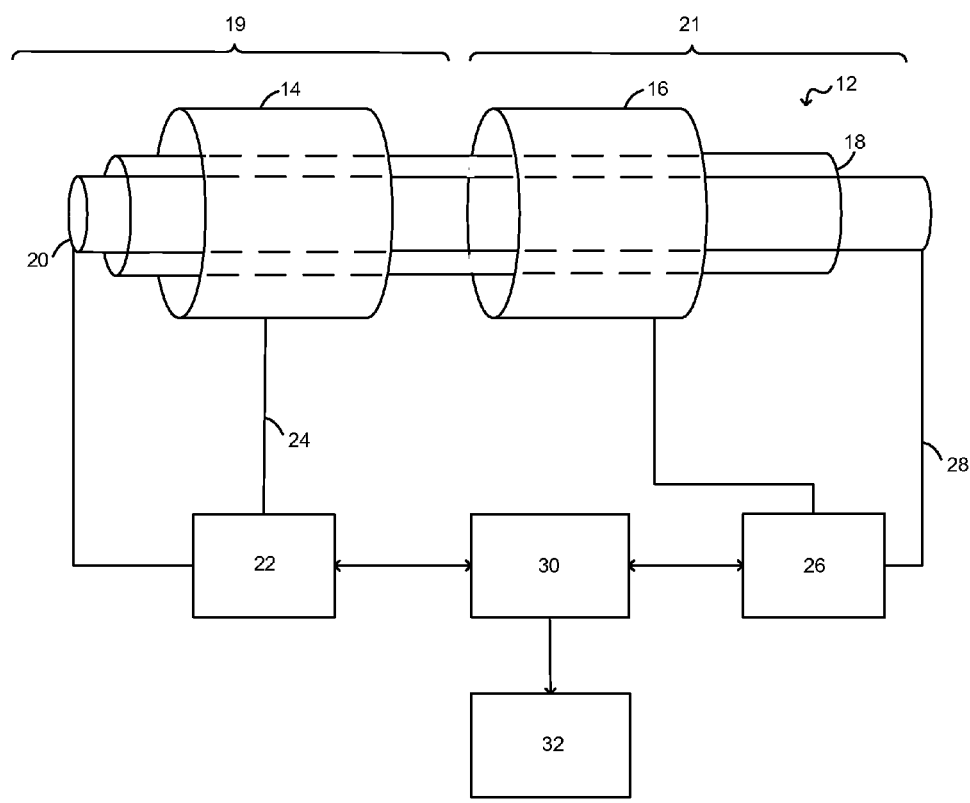
FIG. 1 is a schematic perspective view of an embodiment of an electrochemical system according to the present teachings.

The present teachings, in part, provide an electrochemical system having an electrochemical device in electrical communication with multiple independent electrical circuits. By providing two or more electrical circuits having separate variable loads, the power output and the lifetime of the electrochemical device can be increased, thereby improving overall device efficiency and performance. Other advantages of the electrochemical device described herein can include enhanced regulation of device temperature and reduced deposition of interfering substances on the device's electrodes.

Throughout the description, where devices or compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps. It should be understood that the order of steps or order for performing certain actions is immaterial so long as the method remains operable. Moreover, two or more steps or actions can be conducted simultaneously.

In the application, where an element or component is said to be included in and/or selected from a list of recited elements or components, it should be understood that the element or component can be any one of the recited elements or components and can be selected from two or more of the recited elements or components.

The use of the singular herein includes the plural (and vice versa) unless specifically stated otherwise. In addition, where the use of the term "about" is before a quantitative value, the present teachings also include the specific quantitative value itself, unless specifically stated otherwise.

In general, the present teachings relate to an electrochemical system having an electrochemical device that is in electrical communication with multiple independent circuits. The electrochemical device can be an electrolyzer (i.e., a device using an electric current to decompose a compound into its elements) or an electrochemical cell (i.e., a device that can be used to generate an electric current, e.g., a fuel cell). Although the present teachings relate to electrolyzers and other electrochemical devices, for brevity, the description below will illustrate the present teachings using embodiments relating to fuel cells only.

The scope of the present teachings further encompasses different types of fuel cells including, but not limited to, a solid oxide fuel cell, a proton exchange membrane fuel cell, a phosphoric acid fuel cell, an alkaline fuel cell, a molten carbonate fuel cell, and a direct methanol fuel cell. For brevity, only the solid oxide fuel cell embodiment will be discussed in detail below. However, the present teachings relate to each type of fuel cell. Fuel cells of the present teachings can have different structural designs. For example, the fuel cell can be a tubular fuel cell (see FIG. 1) or a planar fuel cell (see FIG. 2 and FIG. 3). The fuel cell also can be based on a monolith structure. A "monolith" can include any structural configuration that is neither tubular nor planar, and can have, for example, an elongated, flattened tubular shape, a dome or spiral shape and so forth. The fuel cell can be anode-supported, cathode-supported, electrolyte-supported or substrate-supported.

A typical fuel cell includes an anode, a cathode, an electrolyte, and an electrical circuit connecting the anode and the cathode. A fuel cell according to the present teachings, however, generally includes a first electrode, a second electrode, and a third electrode. The first electrode and the second electrode can be of the same type of electrode, while the third electrode can be of a different type (i.e., a complementary type) of electrode. In some embodiments, each of the first electrode and the second electrode can be an anode, and the third electrode can be a cathode. In other embodiments, each of the first electrode and the second electrode can be a cathode, and the third electrode can be an anode. For example, a fuel cell according to the present teachings can include an electrode of a first type (e.g., an anode) and two or more electrodes of a second type that is complementary to the first type (e.g., two or more cathodes), or vice versa.

To draw power from the fuel cell, the fuel cell can be connected to one or more loading devices. Each of the one or more loading devices applies an electrical load to each fuel cell circuit. The application of the electrical load results in a positive current output (as well as a positive power output) from the fuel cell circuit and a reduction in the electrical potential across the corresponding section of the fuel cell. For example, a first loading device can be connected to the first electrode and the third electrode of the fuel cell through a first electrical circuit. The section of the fuel cell electrically connected by the first electrical circuit can be referred to as the front end of the fuel cell. The first loading device can control the power output of the first electrical circuit. A second loading device can be connected to the second electrode and the third electrode of the fuel cell through a second electrical circuit. The section of the fuel cell electrically connected by the second electrical circuit can be referred to as the back end of the fuel cell. The second loading device can control the power output of the second electrical circuit. Although a device including three electrodes connected to two independent electrical circuits is specifically described, a person skilled in the art will understand that the present teachings can be applied to similar devices including more than two independent electrical circuits, for example, three, four, five or more independent electrical circuits, each having an independent electrical load applied to it. Furthermore, while loading devices may be illustrated as separate units in the description and the figures, the loading devices are not necessarily separate in the physical sense. For example, while in some embodiments, reference is made to a first loading device and a second loading device, the first loading device and the second loading device do not have to be separate physical units and can take the form of one combined device as long as the combined device can apply one or more independent electrical loads to the multiple electrical circuits.

The first loading device and the second loading device can be adapted to operate at the same electrical load or at different electrical loads. For example, the first loading device and the second loading device can independently operate at a first electrical load and a second electrical load. The first electrical load can result in a first electrical potential across a first section, i.e., the front end, of the fuel cell. The second electrical load can result in a second electrical potential across a second section, i.e., the back end, of the fuel cell. Each of the first electrical potential and the second electrical potential can be between about 0.3 V and the open circuit voltage ("OCV"). As used herein, "open circuit voltage" is the potential difference between two terminals when the electrical load is zero. The open circuit voltage of the first circuit can be the potential difference between the first electrode and the third electrode, while the open circuit voltage of the second circuit can be the potential difference between the second electrode and the third electrode. With respect to fuel cells specifically, this potential difference can be related to the relative concentrations of oxidant on the anode side and on the cathode side of the fuel cell. The potential difference also can be related to the electrolyte and the type of fuel that are used. Exemplary open circuit voltages for a fuel cell of the present teachings can range from about 0.9 V to about 1.2 V. However, the open circuit voltage can change while the fuel cell is in operation. For example, interfering substances (e.g., carbon or sulfur deposits) formed during operation of the fuel cell can be deposited on the surfaces of the electrodes and can decrease the electrical potential between the two electrodes.

The first loading device and the second loading device can be adapted to operate at various electrical loads at various times. In some embodiments, the first loading device and the second loading device can be adapted to operate simultaneously at the same electrical load or at different electrical loads. In other embodiments, the first loading device and the second loading device can be adapted to operate out-of-phase at the same electrical load or different electrical loads. For example, at a certain point of time, the first loading device can be adapted to operate at an electrical load resulting in a voltage across the front end of the fuel cell of about 0.5 V (or in another embodiment, about 0.7 V), while the second loading device operates at a zero electrical load results in OCV across the back end of the fuel cell. At a different point of time, the second loading device can be adapted to operate at an electrical load resulting in a voltage across the back end of the fuel cell of about 0.5 V (or in another embodiment, about 0.56 V), while the first loading device operates at a zero electrical load and results in OCV across the front end of the fuel cell.

A microprocessor can be used to control the electrical potentials applied to the first loading device and the second loading device. For example, the microprocessor can be programmed to vary the electrical loads independently and at different times to optimize the performance of the fuel cell. This optimization will be discussed in greater detail below. Additionally, the first loading device and the second loading device can be adapted to operate independently to draw an independent current output and an independent power output from each of the first electrical circuit and the second electrical circuit.

A microprocessor also can be used to regulate and combine the power outputs from the first circuit and the second circuit.

For example, if the first circuit outputs about 50 W and the second circuit outputs about 25 W, a transformer can be implemented and controlled by the microprocessor to produce a combined output at one wattage, for example, an output of about 75 W. Further, since an electrical load connected to and drawn on an electrical circuit of a fuel cell correlates to the amount of oxidant ionized at the cathode, any changes to the electrical load can alter the reaction rate between the oxygen ions and the hydrogen fuel at the anode. This, in turn, can affect the power output and the temperature of the fuel cell.

Therefore, the microprocessor mentioned above can be used to optimize the performance of the fuel cell, including optimization of the power output and operating temperature, by monitoring and appropriately adjusting the electrical load applied to each of the independent circuits. Accordingly, fuel cells of the present teachings not only include multiple electrodes or electrode segments of a particular type, but also include two or more independent electrical circuits connecting the electrodes to two or more loading devices. The multiple circuits can operate independently and can allow the application of more than one electrical load to different sections of the fuel cell, the benefits of which are described in greater detail below.

FIG. 1 is a schematic perspective view of an embodiment of a tubular fuel cell 12 according to the present teachings. Referring to FIG. 1, the fuel cell 12 has a first electrode 14, a second electrode 16, an electrolyte 18, a front end 19, a third electrode 20, and a back end 21. To draw current or power from the fuel cell 12, the first electrode 14 and the third electrode 20 are connected to a first loading device 22 by a first electrical circuit 24, while the second electrode 16 and the third electrode 20 are connected to a second loading device 26 by a second electrical circuit 28. A microprocessor 30 controls the first loading device 22 and the second loading device 26 and transmits the resultant output 32.

Tubular fuel cells of the present teachings similar to the one depicted in FIG. 1 can be anode-supported, cathode-supported, electrolyte-supported, or substrate-supported. Specifically, the embodiment shown in FIG. 1 depicts a common supporting anode 20 and two cathodes 14, 16. In some embodiments (not shown), the supporting tubular anode can include a plurality of supporting elements, e.g., longitudinal elevations or bosses, protruding from its interior wall to its hollow central bore as disclosed in U.S. Pat. No. 6,998,187, which is incorporated by reference herein. Such internal longitudinal elevations or bosses can reinforce the structure of the entire cell, increase electrode surface area, optimize the anode electronic conductivity, and facilitate the mounting of the fuel cell into an assembly system (e.g., a fuel cell stack).

As mentioned above, incorporating multiple independent circuits in a single fuel cell can increase efficiency. For example, when a fuel cell is connected to two independent electrical circuits of equal lengths, the distance the electrons travel is reduced to at least half the distance of a single-circuit fuel cell, because electrons will travel along a preferential common pathway, i.e., the shortest distance, to the power source. A shortened path for the electrons results in less resistance encountered along the electrical circuit, which in turn increases the power output and efficiency of the fuel cell. The addition of a second electrical circuit provides a shortcut for fuel to enter the back end of the fuel cell. This reduces the reaction rate at the front end of the fuel cell which can result in better thermal balance and increased lifetime for the fuel cell.

Further, since electrical load and power are related to the temperature of the fuel cell, adjusting the electrical load applied to each section of the fuel cell can control the temperature of the fuel cell. For example, if the front end of the fuel cell is operating at a higher temperature than the back end of the fuel cell, one can reduce the electrical load applied to the front end and increase the electrical load applied to the back end to provide improved thermal balance. The microprocessor can alternate the application of higher and lower electrical loads to regulate the overall temperature of the fuel cell.

Multiple independent electrical circuits with individual separate loading devices also permit control of the electrical potentials across different sections of the fuel cell. For example, an electrical load can be applied at time $t_1$ first to the front end, which includes a first circuit. At time $t_2$, the electrical potential at the front end can be changed to OCV, i.e. no electrical load is applied to the front end of the fuel cell, while an electrical load can be applied to the back end, which includes a second circuit. Thus, different sections of the fuel cell can operate in an alternate manner, or otherwise out-of-phase. When the front end is operated at the OCV, no fuel will be consumed at the front end and all of the fuel will travel to and react at the back end. This can result in a ripple or pulse of fuel traveling through the cell. Alternating operation of different sections of the fuel cell can therefore improve the overall efficiency, power density and thermal regulation of the fuel cell by optimizing the performance of individual sections of the fuel cell at different times.

Additionally, controlling the electrical loads applied to each circuit in the fuel cell can cleanse the electrode surfaces and prevent deposition of interfering substances such as sulfur and carbon. For example, many electrodes used in fuel cells contain nickel, and hydrocarbons are often used to operate fuel cells. Such carbon-containing fuels (e.g., propane) can react with the nickel to form various by-products, leading to deposits of carbon on the electrodes. If the fuel cell is tubular, the carbon buildup can result in a blockage of the fuel cell cylinder. Additionally, the carbon deposits can interfere with the reaction chemistry of the fuel cell and disable its operation. Furthermore, carbon filaments can form on the inner surface of the electrode(s) causing potential cracking and damage to the fuel cell.

The carbon deposits can be removed by reacting the deposited carbon with oxygen/water to form either carbon monoxide or carbon dioxide. This transformation can be achieved by applying different electrical loads to the independent electrical circuits, thus controlling the reaction rates at different sections of the fuel cell. For example, if the first circuit is operated at a higher electrical load, for example, an electrical load resulting in a voltage across the front end of the cell of about 0.5 V, more oxygen ions will be driven through the electrolyte at the front end, which in turn will increase the temperature at the front end and will change the rate at which carbon is removed from the inner surface of the anode at the front end. The second circuit, however, can be operated at a lower electrical load, for example, an electrical load resulting in a voltage across the back end of the cell of about 0.9 V. The back end of the fuel cell will then receive a pulse of water, which is produced as a by-product of the increased reaction rate at the front end. This water by-product can react with the deposited carbon and remove the carbon from the surface of the anode. As mentioned above, a microprocessor can be used to alternate the electrical loads applied to different sections of the fuel cell such that after a period of operation, a higher electrical load can be applied to the first circuit and a lower electrical load can be applied to the second circuit to remove the carbon buildup from the front end of the fuel cell.

The same process also applies for the removal of sulfur from the surface of the anode. Most fuels are odorless and have sulfur added to them for safety reasons. This sulfur additive can adhere itself to the nickel coating on the anode. The methods described above for removal of carbon deposits also can be used to remove sulfur deposits.

Components of the fuel cells described above can be made of various materials known in the art. For example, suitable materials for the anode, the cathode, and the electrolyte of a solid oxide fuel cell are described in co-pending patent application Ser. No. 10/999,735 (now U.S. Pat. No. 7,498,095), which is incorporated by reference herein. In some embodiments, the anode can be made from a metal/ceramic composite, also known as a cermet. The ceramic component can contain yttria-stabilized zirconia (YSZ) or other ceramic materials such as oxides of cerium, and scandia-stabilized zirconia (SSZ). The metal phase can contain a transition metal, an alloy or a physical mixture thereof, including, without limitation, nickel, titanium, vanadium, ruthenium, rhodium, rhenium, palladium, magnesium, iron, and copper. In some embodiments, the cathode can be made from a perovskite such as, without limitation, $LaSrMnO_3$, (LaSr)(CoFe)$O_3$, $LaCaMnO_3$, and (LaCa)(CoFe)$O_3$. In some embodiments, the electrolyte can include an ion-conducting material such as a metal oxide ceramic (e.g., zirconia), a stabilized metal oxide ceramic (e.g., YSZ, SSZ), or an electrolytic cermet, which can include a ceramic material (e.g., a stabilized zirconia, a doped ceria, or mixtures thereof) and a metallic component as described above in connection with the anode. In addition, to the extent that the electrode(s) are made of a porous material, a wash-coat composition including one or more salts (e.g., nitrate salts) of a transitional metal (e.g., cerium, cobalt, copper, iron, molybdenum, nickel, silver, and tungsten) can be applied to the electrode(s) to improve the performance of the fuel cell as disclosed in U.S. patent application Ser. No. 11/002,394 (now U.S. Pat. No. 7,476,461), which is incorporated by reference herein. Further, a person skilled in the art will recognize that while the devices described herein include multiple independent electrical circuits sharing one or more common electrodes, electrodes unique to an individual circuit can be constructed as separate electrodes or as a single electrode divided into different segments. Similarly, the electrolyte layer can be a continuous layer or a discontinuous, segmented layer between the electrodes.

Figure 2:
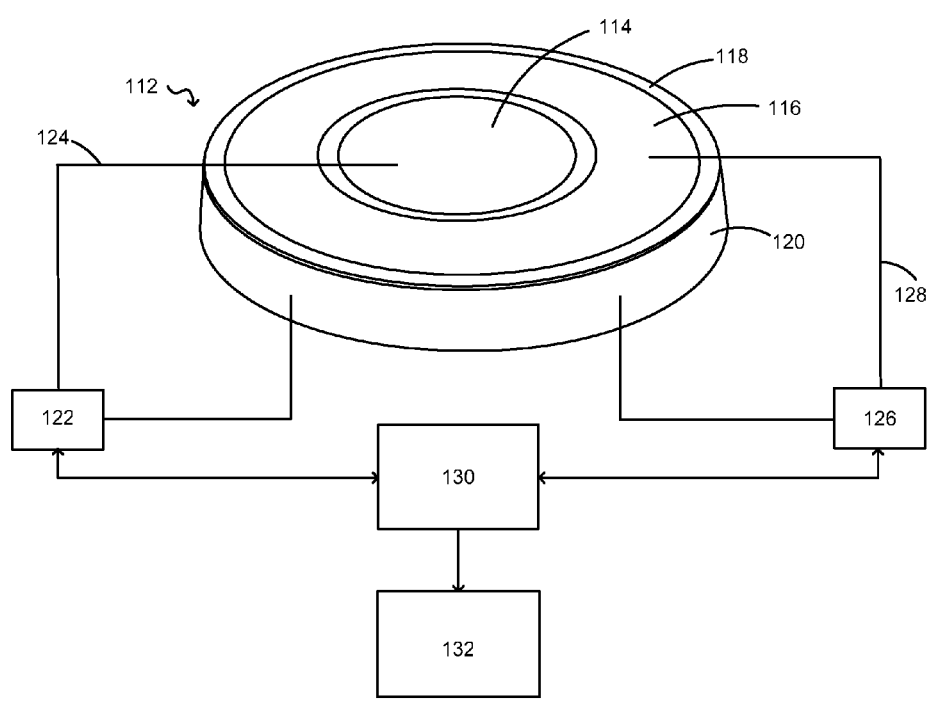
FIG. 2 is a schematic perspective view of another embodiment of an electrochemical system according to the present teachings.

FIG. 2 depicts another embodiment of the present teachings. FIG. 2 depicts a planar fuel cell 112 having a first electrode 114, a second electrode 116, an electrolyte 118, and a third electrode 120. The first electrode 114 and the second electrode 116 are depicted as the same type (e.g., anodes), and the third electrode 120 is depicted as a different type (e.g., a cathode). A first loading device 122 is connected to the first electrode 114 and the third electrode 120 through a first circuit 124. A second loading device 126 is connected to the second electrode 116 and the third electrode 120 through a second circuit 128. A microprocessor 130 controls the first loading device 122 and the second loading device 126 and transmits the resultant output 132 as discussed above.

Figure 3:
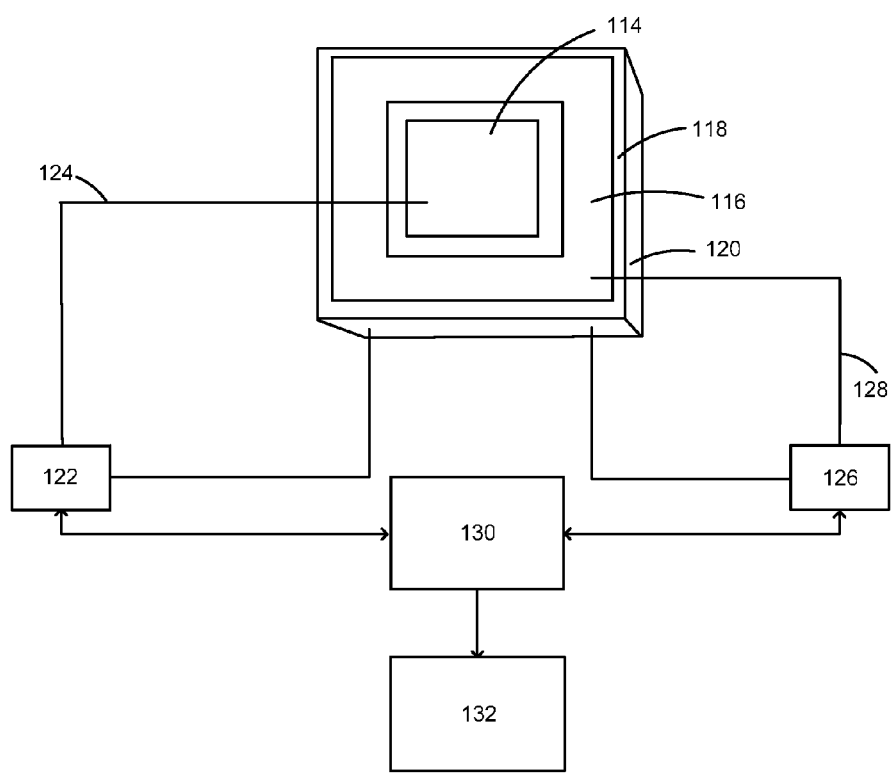
FIG. 3 is a schematic perspective view of another embodiment of an electrochemical system according to the present teachings.

FIG. 3 depicts yet another embodiment of the present teachings. FIG. 3 is an alternative embodiment of a planar fuel cell. Instead of having a circular geometry, the planar fuel cell in FIG. 3 has electrode plates of a rectangular shape. The reference numbers in FIG. 3 refer to the same elements as described in connection with FIG. 2. Referring to FIG. 2 and FIG. 3, concentric arrangement of the electrodes can decrease the radial distance traveled by the electrons, thus reducing resistance and optimizing output as described above. The multiple independent circuits can facilitate the regulation of temperature and reaction rate across the surface of the fuel cell.

In some embodiments, a plurality of fuel cells are electrically connected to form a fuel cell stack. The stack permits increased power output by combining the outputs of multiple fuel cells. For example, a fuel cell stack can include a plurality of tubular fuel cells disposed around a central support tube, which can include a fuel reformer and other features as disclosed in U.S. patent application Ser. No. 10/939,185 (now U.S. Pat. No. 7,629,069), which is incorporated by reference herein. The stack also can include tubular fuel cells stacked on top of each other. In some embodiments, the plurality of fuel cells can be designed as an assembly with a current collection plate. The number of fuel cells in a stack can be any number that is practical in terms of packing, connection, and/or operation. For example, 2, 5, 10, 20, 36, 50 or more fuel cells can be bundled to form a fuel cell stack.

In another aspect, the present teachings relate to methods of operating an electrochemical device. The methods can include providing an electrochemical device including a first electrical circuit having a first loading device and a second electrical circuit having a second loading device, where the first electrical circuit and the second electrical circuit are in electrical communication with a common electrode. A first electrical load is applied to the first electrical circuit, while a second electrical load is applied to the second electrical circuit. The electrochemical device can be a fuel cell or an electrolyzer having one or more of the features described above. For example, the common electrode can be an anode or a cathode.

The first electrical load and the second electrical load applied, as discussed above, can result in a first electrical potential across the first electrode and the second electrode, and a second electrical potential across the second electrode and the third electrode, respectively. The first electrical potential and the second electrical potential can be between about 0.3 V and the open circuit voltage. The first electrical load and the second electrical load can be the same or different. The first electrical load and the second electrical load can be applied simultaneously or can be applied out-of-phase. In some embodiments, the first electrical circuit can be in electrical communication with a first anode, and the second electrical circuit can be in electrical communication with a second anode. In certain embodiments, a fuel can be alternatively introduced to one of the first anode and the second anode.

Another embodiment of the present teachings relates to a method of operating a fuel cell by alternating the introduction of a fuel/air mixture to two separate anodes. In this embodiment, the fuel cell has a common cathode and two anodes. During regular operation of a fuel cell, an oxidant, often in the form of air, is delivered to the cathode and a fuel/oxidant mixture is delivered to the anode. Where there are two anodes, the fuel delivery can be alternated between the two anodes. Alternating fuel delivery can reduce carbon deposits or coking on the anode(s) of the fuel cell and can also reduce the deposition of sulfur on the anode(s), thus improving performance and increasing the useful life of the fuel cell.

In another embodiment, the present teachings relate to a method of operating a fuel cell by alternating the introduction of oxidant to two separate cathodes. In this embodiment, the fuel cell has a common cathode and two anodes. Where there are two cathodes, the oxidant delivery can be alternated between the two cathodes.

Aspects of the present teachings can be further understood in light of the following example, which should not be construed as limiting the scope of the present teachings in any way.

Examples

The anode-supported tubular solid oxide fuel cells were made using an extrusion process. Raw materials (e.g. YSZ, SSZ) and metal oxide powders (e.g. NiO, CuO) were first mixed with a binder and a solvent to form a paste. The paste was then extruded to a desired shape through a reduction extrusion die. The extrudate was dried in an oven at a controlled temperature and moisture level before prefiring the anode support in a furnace. A thin electrolyte membrane was applied onto the prefixed anode tubes through dip-coating, followed by drying and sintering. Two or more cathode segments of equal or varying lengths were applied on top of the sintered electrolyte by brush painting, air spraying, or dipping, followed by firing. Metallic current collections were applied on both the anode and the cathode before fuel cell performance testing and evaluation. The fuel cells were first reduced (to reduce the anode from oxide to metal) in an electric furnace before electrochemically testing and evaluating their performance at certain temperatures and fuel flow rates.

Two anode-supported tubular solid oxide fuel cells (Cell 1 and Cell 2) were prepared according to the procedures described above. Cell 1 and Cell 2 vary in both dimensions and materials. Both Cell 1 and Cell 2 were tested in four configurations: (a) the front end of the cell only (i.e., one circuit), (b) the back end of the cell only (i.e., one circuit), (c) both the front end and the back end of the cell, respectively (i.e., one circuit), and (d) both the front end and the back end of the cell, respectively (i.e., two independent circuits). Each cell was tested under the same conditions (i.e., same operating temperature, fuel flow rate, and electrical load) for those four configurations. To illustrate the advantages of the present teachings, the power output of the two cells were compared when an electrical load was connected to (a) the front end of the cell only (i.e., one circuit), (b) the back end of the cell only (i.e., one circuit), (c) the entire cell (i.e., one circuit), and (d) both the front end and the back end of the cell, respectively (i.e., two independent circuits).

Figure 4:
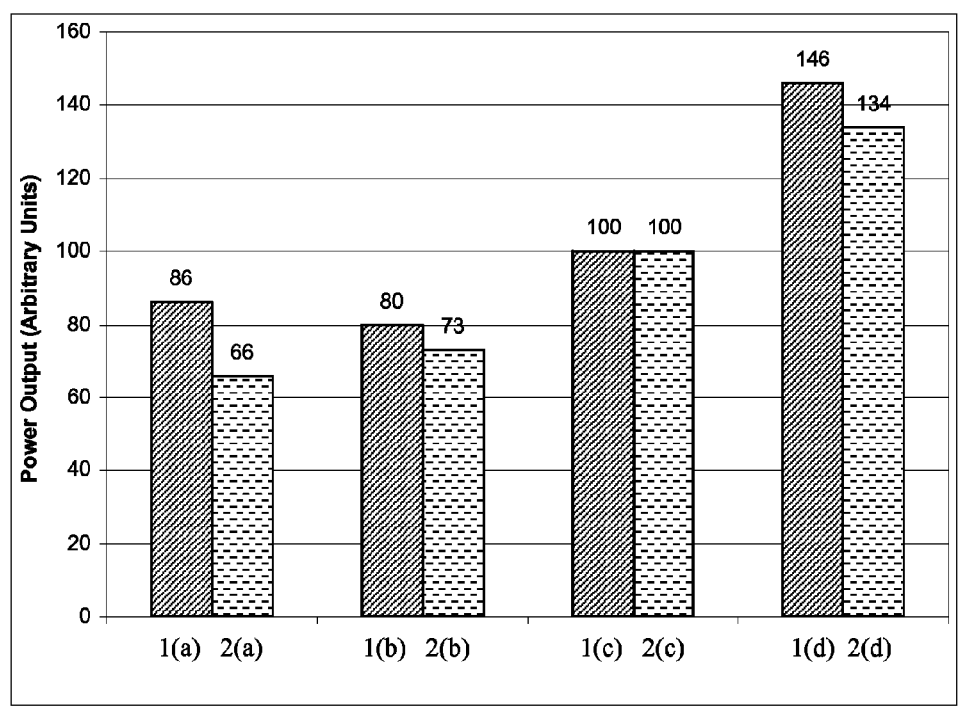
FIG. 4 displays the power output of two fuel cells according to the present teachings (Cell 1 and Cell 2) when an electrical load was connected to (a) the front end of the cell only (i.e., one circuit), (b) the back end of the cell only (i.e., one circuit), (c) both the front end and the back end of the cell, respectively (i.e., one circuit), and (d) both the front end and the back end of the cell, respectively (i.e., two independent circuits).

To facilitate comparison, the power output that was measured when an electrical load was connected to the entire cell was normalized and was represented as a power output of 100 units (see bar graphs 1(c) and 2(c) in FIG. 4). The power output measurements for the other parameters (i.e., (a), (b), and (d)) were compared to the values obtained for (c) and expressed as relative percentages accordingly. FIG. 4 summarizes the results.

Referring to FIG. 4, when an electrical load was connected to only either the front end or the back of the cell, the power output was between about 66-86 units (see bar graphs 1(a)-(b) and 2(a)-(b), respectively). However, when the same fuel cells were connected to two independent loading devices/circuits according to the present teachings, the power output increased to about 130-150 units (see bar graphs 1(d) and 2(d)), which equates to a 30-50% increase in power output compared to the use of a single circuit (see bar graphs 1(c) and 2(c)), or 80-100% increase in power output compared to the use of a single circuit and single end current collection (see bar graphs 1(a) & 2(a), 1(b) & 2(b), and 1(d) & 2(d)).

Other Embodiments

The present teachings can be embodied in other specific forms, not delineated above, without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A method of operating a fuel cell, the method comprising:
    providing a tubular fuel cell having a length divided into a front end and a back end, wherein the tubular fuel cell comprises an anode extending from the front end to the back end, a first cathode extending within the front end, a second cathode extending within the back end, and an electrolyte separating the anode from each of the first cathode and the second cathode;
    providing a first loading device that is electrically connected to the first cathode and the anode in a first electrical circuit;
    providing a second loading device that is electrically connected to the second cathode and the anode in a second electrical circuit;
    introducing a fuel along the anode from the front end of the tubular fuel cell to the back end of the tubular fuel cell; and
    varying independently a first electrical load applied by the first loading device to the first electrical circuit and a second electrical load applied by the second loading device to the second electrical circuit, such that during operation of the tubular fuel cell, the electrical potential across the front end of the tubular fuel cell is different from the electrical potential across the back end of the tubular fuel cell.

2. The method of claim 1 comprising applying the first electrical load and the second electrical load simultaneously, wherein the first electrical load and the second electrical load are different.

3. The method of claim 1 comprising applying the first electrical load and the second electrical load out-of-phase.

4. The method of claim 1, wherein an oxidant is introduced alternatively to the first cathode and the second cathode.

5. The method of claim 1 further comprising controlling the first loading device and the second loading device with a microprocessor capable of being programmed to vary the first electrical load and the second electrical load independently and at different times.

6. The method of claim 1, wherein the electrical potential across the front end of the tubular fuel cell and the electrical potential across the back end of the tubular fuel cell independently are between 0.3 V and the open circuit voltage of the tubular fuel cell.

7. The method of claim 6 comprising applying the first electrical load and the second electrical load out-of-phase, such that at alternating points of time, the electrical potential across either the front end or the back end of the tubular fuel cell is the open circuit voltage of the tubular fuel cell while the electrical potential across the other end of the tubular fuel cell is at least 0.3 V but less than the open circuit voltage of the tubular fuel cell.

8. The method of claim 6 comprising applying the first electrical load and the second electrical load simultaneously, wherein the first electrical load and the second electrical load are different and the electrical potential across the front end of the tubular fuel cell and the electrical potential across the back end of the tubular fuel cell independently are at least 0.3 V but less than the open circuit voltage of the tubular fuel cell.

9. The method of claim 1, wherein the tubular fuel cell comprises a monolith structure.

10. The method of claim 1, wherein the tubular fuel cell comprises an anode-supported structure.

11. The method of claim 1, wherein the tubular fuel cell is a solid oxide fuel cell.

12. The method of claim 11, wherein the electrolyte is composed of yttria-stabilized zirconia.

13. The method of claim 11, wherein the anode is composed of a cermet comprising nickel and yttria-stabilized zirconia.

14. The method of claim 11, wherein the cathode is composed of a perovskite.

15. A method of operating a fuel cell, the method comprising:
providing a fuel cell having a length divided into a front end and a back end, wherein the fuel cell comprises an anode extending along the entire length of the fuel cell, a first cathode extending within the front end, a second cathode extending within the back end, and an electrolyte separating the anode from each of the first cathode and the second cathode;
providing a first loading device that is electrically connected to the first cathode and the anode in a first electrical circuit;
providing a second loading device that is electrically connected to the second cathode and the anode in a second electrical circuit;
introducing a fuel along the anode from the front end of the fuel cell to the back end of the fuel cell; and
varying independently a first electrical load applied by the first loading device to the first electrical circuit and a second electrical load applied by the second loading device to the second electrical circuit, such that during operation of the fuel cell, the electrical potential across the front end of the fuel cell is different from the electrical potential across the back end of the fuel cell.

16. The method of claim 15, wherein the fuel cell is a tubular fuel cell.

17. The method of claim 16, wherein the anode extending along the entire length of the fuel cell is a common supporting anode.

18. The method of claim 15, wherein the anode extending along the entire length of the fuel cell is a common supporting anode.

19. The method of claim 15 further comprising controlling the first loading device and the second loading device with a microprocessor capable of being programmed to vary the first electrical load and the second electrical load independently and at different times.

20. A method of operating a fuel cell, the method comprising:
providing a tubular solid oxide fuel cell having a length divided into a front end and a back end, wherein the tubular solid oxide fuel cell comprises a common anode extending along the entire length of the tubular solid oxide fuel cell, a first cathode extending within the front end, a second cathode extending within the back end, and an electrolyte separating the common anode from each of the first cathode and the second cathode;
providing a first loading device that is electrically connected to the first cathode and the common anode in a first electrical circuit;
providing a second loading device that is electrically connected to the second cathode and the common anode in a second electrical circuit;
introducing a fuel along the common anode from the front end of the tubular solid oxide fuel cell to the back end of the tubular solid oxide fuel cell; and
varying independently a first electrical load applied by the first loading device to the first electrical circuit and a second electrical load applied by the second loading device to the second electrical circuit by controlling the first loading device and the second loading device with a microprocessor programmed to vary the first electrical load and the second electrical load independently, such that during operation of the tubular solid oxide fuel cell, the electrical potential across the front end of the tubular solid oxide fuel cell is different from the electrical potential across the back end of the tubular solid oxide fuel cell.

* * * * *